Feb. 7, 1939.                S. BRAND ET AL                 2,146,695
                MANUALLY CONTROLLED CHECK SORTING MACHINE
                        Filed April 8, 1937           6 Sheets-Sheet 1

INVENTORS
Samuel Brand
John N. Whelu
W. McClean
ATTORNEY

Feb. 7, 1939.  S. BRAND ET AL  2,146,695
MANUALLY CONTROLLED CHECK SORTING MACHINE
Filed April 8, 1937  6 Sheets-Sheet 5

Feb. 7, 1939.                S. BRAND ET AL                2,146,695
                MANUALLY CONTROLLED CHECK SORTING MACHINE
                    Filed April 8, 1937        6 Sheets-Sheet 6

INVENTORS
Samuel Brand
John N. Wheeler
BY
ATTORNEY

Patented Feb. 7, 1939

2,146,695

UNITED STATES PATENT OFFICE

2,146,695

MANUALLY CONTROLLED CHECK SORTING MACHINE

Samuel Brand, Binghamton, and John N. Wheeler, Apalachin, N. Y., assignors to International Business Machines Corporation, New York, N. Y., a corporation of New York Application April 8, 1937, Serial No. 135,644

15 Claims. (Cl. 209—122)

The improvements forming the subject matter of the present invention is adapted to be applied to machines of the type disclosed in the patent to F. L. Fuller, #1,966,623 issued July 17, 1934, and in the application of F. L. Fuller and S. Brand, Serial No. 743,044, filed September 7, 1934. It is thought that the nature of the improvements will be better understood by preceding the description thereof by a brief description of the machine.

Such machines are of the type known as check sorting machines and are adapted to sort groups of promiscuously arranged checks and list the amounts of the checks in classified groups by separate tapes. The amounts of the checks are listed on a ten-key keyboard and the checks are dropped in an aperture which communicates with a selected compartment in the sorting drum. The drum is rotated under control of keys of a second keyboard to bring the selected compartment into registration with the aperture.

Such machines are provided with a plurality of totalizers, and a plurality of amount printers so that the latter can list the amounts of the checks on separate tapes, while the totalizers accumulate the amounts and provide the totals of the amounts of all checks of each classification.

The operation of check feeding, printing and accumulating mechanisms is under control of a motor release bar which when depressed effects the concomitant operation of the three mechanisms. Since there must be a check fed for each amount printed and accumulated it is essential that safeguards be provided to insure invariable check feeding operations and insure that if check feeding operations are not performed, or improperly performed, that the operator be apprised of this fact and the conditions remedied.

One object of the present invention is to provide a check sensing mechanism for the machine which determines whether a check has been fed into a selected compartment and to cause the operation of certain controlling mechanism to lock the motor release bar against a subsequent operation and to render the keys which select the compartments inoperative. A further object in this connection is to provide means under manual control to recondition the machine so that operations under control of the compartment selecting keys and motor release bar may be subsequently performed.

A still further object is to indicate to the operator the fact that the single revolution of the check feeding rollers has not completely fed the check to a selected compartment due to several abnormal conditions. This might be occasioned by attempting to feed a check of an abnormal width, which dimension is in the direction in which it is fed, or inserting a check in between the rollers after they have started to rotate which is after the motor release bar is depressed, or feeding a check in crooked or at an angle to the rollers. The sensing mechanism which controls the indication of this fact renders the keys which selects the compartments inoperative but does not lock the motor release bar. In the event of this condition a buzzer indicates the necessity of a second check feeding operation to completely feed the check to the selected compartment.

A still further object of the invention is to incorporate a sensing mechanism which will determine whether checks are properly fed into selected compartments. The compartments which comprise spaced parallel plates and checks are urged against one of the plates by a clamp which is moved to provide a recess to receive the check, and then moved to clamp checks in the compartment. Sometimes, a check is fed behind the clamp so that it is not held by the clamp and might be free to drop out of the compartment and into the internal mechanism of the machine and thus be damaged.

The sensing mechanism apprises the operator of this condition so that it can be remedied thus obviating further trouble.

Other objects too numerous to mention will be apparent as the description is understood and the incorporation of the various sensing mechanisms described heretofore increase the efficiency of the machine and augments its value as a check or manually controlled record sorting machine.

Check sorting mechanism

Figure 1:
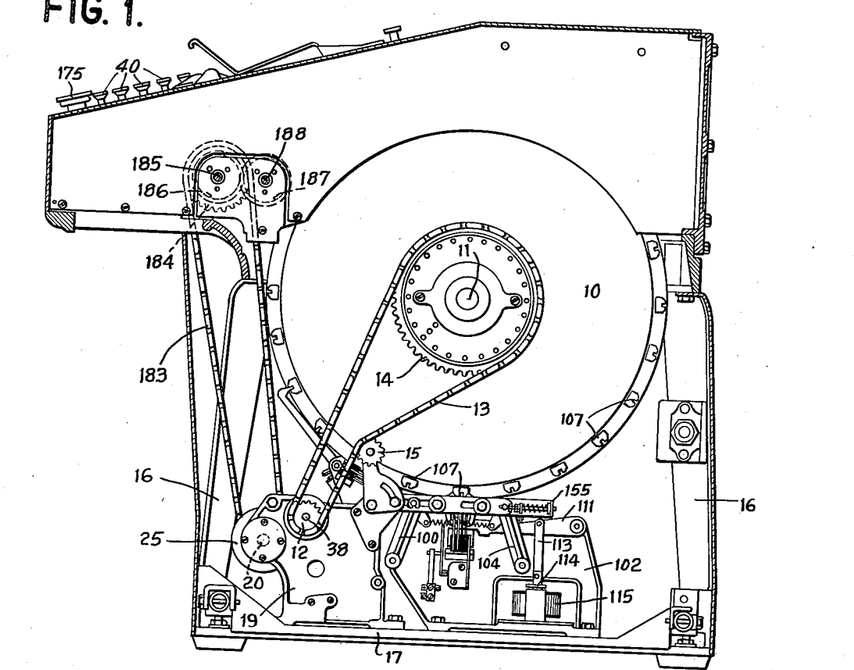
Fig. 1 is a view in side elevation of the right side of the check sorting machine.

Referring to Fig. 1, the drum 10 is securely mounted on the shaft 11, suitably and rotatably supported in the main framework of the machine. The drum 10 is adapted to be driven by a continuous running motor (not shown) through a two-way clutch which drives a sprocket gear 12 (Figs. 1 and 2) in either direction. A chain 13 passes around sprocket gear 14 secured to the shaft 11. An adjustable idler gear 15 insures the proper tension on the chain 13.

The machine is mounted in a framework indicated generally at 16, and is supported on a base 17. The two-way clutch mechanism is mounted between a pair of brackets 18 and 19 secured to the base 17. The motor (not shown) is mounted on the base 17 and drives the clutch mechanism through a shaft 20 mounted in the brackets 18 and 19 and directly connected to the armature shaft of the motor. Secured to shaft 20 midway between the brackets 18 and 19 is a driving clutch member 21, comprising a pair of clutch plates 22 and 23, which rotates continuously with the shaft 20 in the direction indicated by the arrow in Fig. 4. Rotatably mounted on the shaft 20 adjacent the driving clutch members 21 are driven clutch plates 24 and 25, each provided with suitable clutch facing material indicated at 26.

The clutch plate 24 is mounted on a sleeve 27, which sleeve is also integral with a gear 28. The clutch plate 25 is similarly connected by a sleeve 29 to a gear 30 on the shaft 20.

The gear 28 meshes with an intermediate gear 36 which meshes with a gear 37 fast on a shaft 38 mounted in the brackets 18 and 19 and on which is secured the sprocket gear 12. The gear 30 meshes with a gear 39.

Obviously, if the clutch plate 24 is brought into operative contact with the driving plate 22, the clutch plate 24 and the gear 28 will be driven in a clockwise direction, and, through the gears 36, will drive the gear 37, shaft 38 and sprocket gear 12 also in a clockwise direction to rotate the drum 10 in the same direction. However, if clutch plate 25 is brought into contact with the drum plate 23, the plate 25 and the gear 30 are rotated clockwise. The gear 30 meshing directly with the gear 39 drives shaft 38 and sprocket gear 12 in a counterclockwise direction to rotate the drum 10 counterclockwise.

Figure 6:
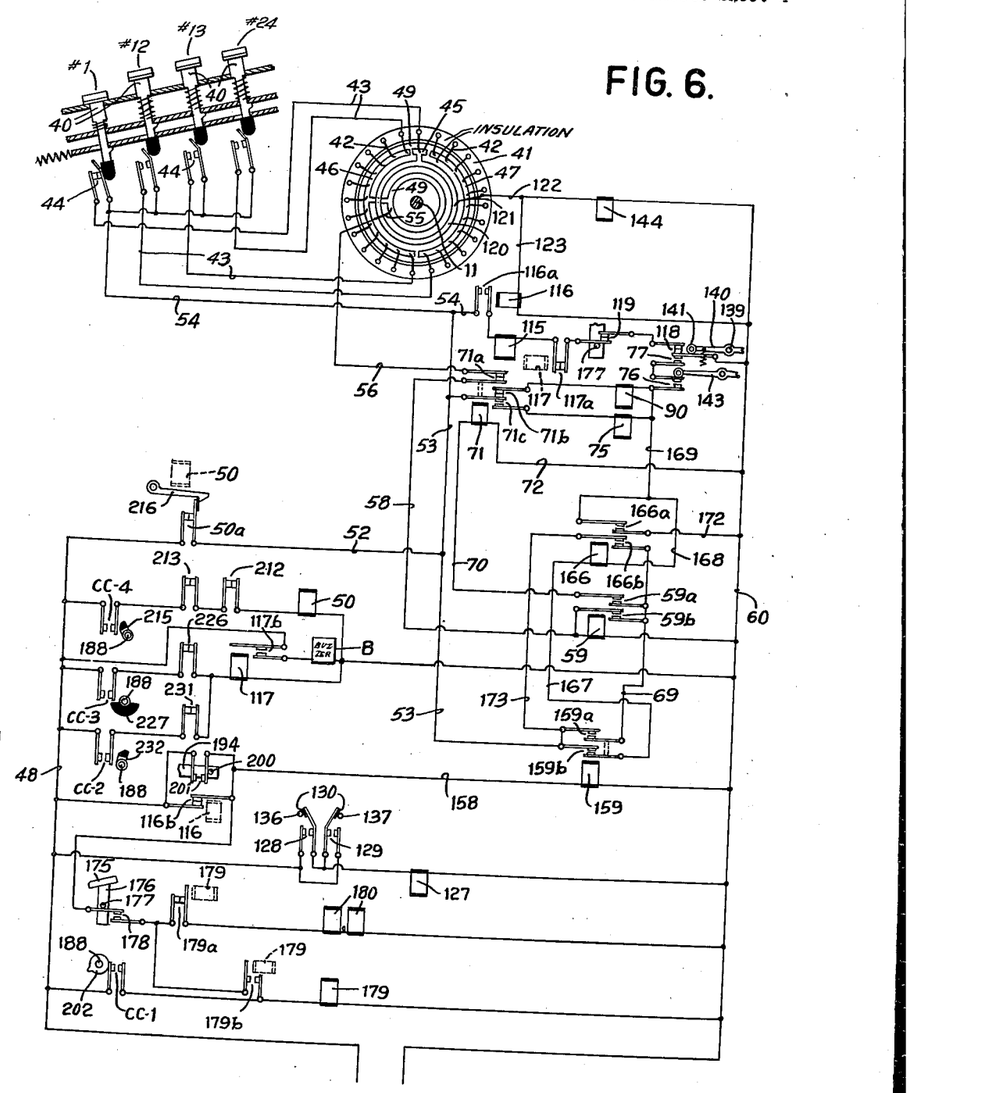
Fig. 6 is an electrical wiring diagram of the machine.

The selective movement of clutch plates 24 and 25 to contact with the driving plate 22 is controlled by the position in which the drum stands and by the particular selector key 40 (Figs. 1 and 6) depressed. Fixed to the framework of the machine and surrounding the drum shaft 11 is a ring 41 (Fig. 6) of insulating material upon which is mounted a series of brushes 42 arranged annularly about the ring 41, there being a brush 42 for each selector key 40. Referring to Fig. 6, these brushes 42 are connected by wires 43 to one side of pairs of contacts 44 adapted to be closed upon depression of a selector key 40. A commutator, comprising conducting segments 45, 46, and 47, and a ring 48 shown diagrammatically in Fig. 6, mounted in a disk 49 of insulating material is fixed to the drum shaft 11 adjacent the ring 41. The brushes 42 are carried by the ring 41 and contact with the segments 45, 46, and 47. When the drum 10 is at rest, the segment 45 is in contact with the brush 42 connected to the contacts 44 associated with the last depressed selector key 40 shown in Fig. 1 as the "1" key at the left. The segment 46 is electrically connected to the ring 49 by a radial strap of conducting material.

Assuming that the main switch (not shown) is closed and the motor is running with the sorting drum standing at the last selected position, for example, the "1" position, we now depress the "13" compartment selector key 40 (see Fig. 6). Depression of this key releases the "1" key which as is clearly explained in the aforementioned Patent #1,966,623 is immediately returned to undepressed position opening the corresponding contacts 44. Depression of the "13" key 40 closes its contacts 44, whereupon a circuit is set up from a line 48 connected to one side of the current supply, relay contacts 50a, now closed, wires 52, 53, and 54, contacts 44 for the "13" compartment key, wire 43 to the corresponding brush 42, segment 46, ring 49, a brush 55, wire 56, relay contacts 71a (now closed), wire 58, relay magnet 59 to the other side of the current supply by a line 60. This energizes relay magnet 59 which closes its relay contacts 59a and 59b, establishing a holding circuit by relay contacts 59b for relay magnet 59 extending as follows: from line 48, relay contacts 50a, wire 52, wire 53, relay contacts 159a now closed since relay magnet 159 is now energized, wire 69, contacts 59b, relay magnet 59, to line 60. Closing of relay contacts 59a establishes a circuit from line 48, relay contacts 50a, wires 52 and 53, relay contacts 159a (now closed), wire 69, relay contacts 59a, wire 70, relay magnet 71, wire 72, to line 60.

Energization of relay magnet 71 opens relay contacts 71a and 71b, and closes relay contacts 71c closing a circuit by the latter from line 48, relay contacts 50a, wires 52 and 53, relay contacts 71c (now closed), clutch control magnet 75, contacts 76 and 77 closed by means to be later described, to line 60. This energizes the clutch control magnet 75.

Figures 4, 5:
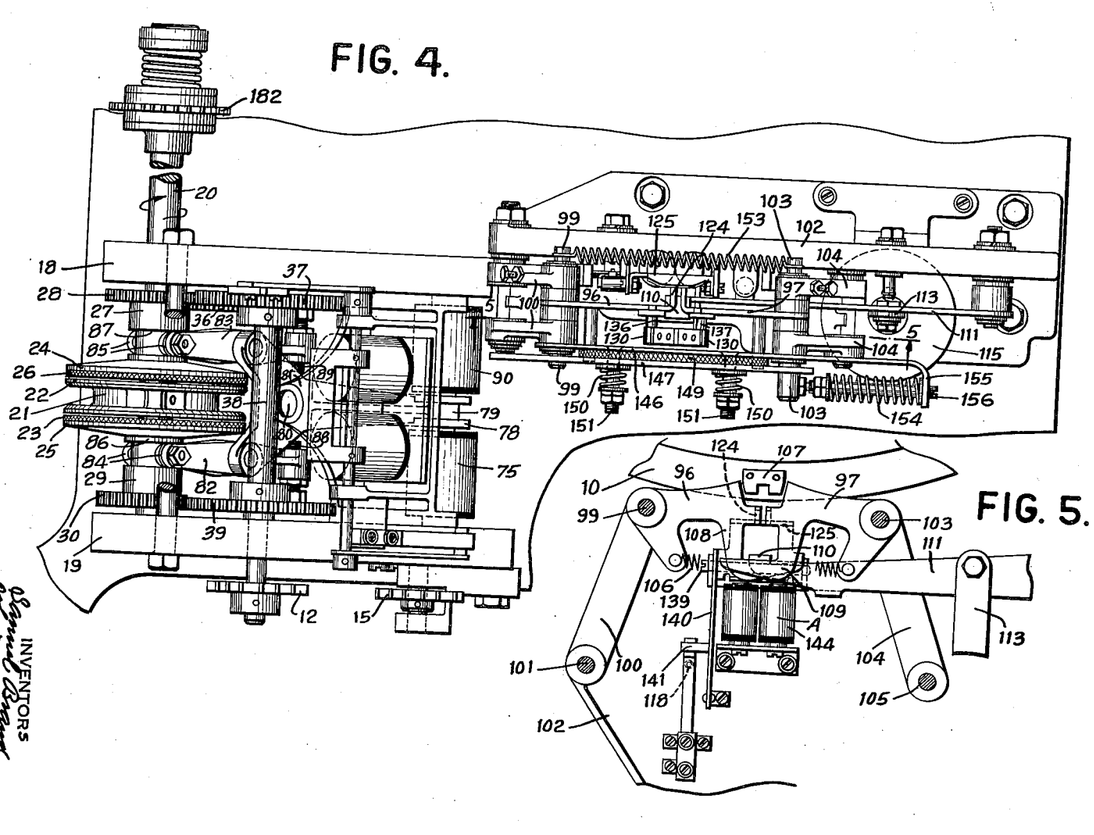
Fig. 4 is a plan view of mechanism shown in Fig. 3.
Fig. 5 is a detail view of certain parts forming part of the drum stopping devices.

Referring now to Fig. 4, when the clutch control magnet 75 is energized it attracts its armature 78 which is carried on the end of a lever 79 pivoted at 80 on a bracket 81 mounted between the brackets 18 and 19. This rocks the lever 79 clockwise (Fig. 4).

Pivotally carried by the levers 79, at the end opposite the armature 78, is a pair of yokes 82 and 83. These yokes carry rollers 84 and 85 projecting into annular grooves 86 and 87 in the sleeves 29 and 27 respectively. At their opposite ends the yokes 82 and 83 carry adjusting studs 88 and 89 bearing against the bracket 81.

When the lever 79 is rocked clockwise under the influence of clutch control magnet 75, it rocks the yoke 82 also clockwise, bringing the clutch plate 25 into contact with the driving member 23, whereupon the gear 30 is driven clockwise (Fig. 2) rotating gear 39 and sprocket gear 12 counterclockwise to rotate the drum 10 in the same direction until the segment 45 contacts the brush 42 associated with the depressed key, in the instant example, the "13" key. The drum is stopped in this position by mechanism later to be described.

Assuming now that the "12" selector key 40 is depressed instead of the "13" key with the "1" key previously depressed. When the drum 10 is standing in the "1" position the drum will rotate in the opposite or clockwise direction to bring the "12" compartment into registry with the check feeding aperture.

Referring to Fig. 6, it may be seen that the brush 42 connected to the "12" key contacts 44 is in contact with the segment 47. This segment 47 having no connection to the ring 49 it is ineffective to energize the relay magnet 59 or the relay magnet 71, therefore, upon closure of contacts 76 and 77 by means to be later described a circuit is established from line 48, relay contacts 50a, wires 52 and 53, relay contacts 71b, a second clutch control magnet 90, contacts 76 and 77 closed by means to be later described, to line 60.

Energization of magnet 90 rocks the arm 79 (Fig. 4) counterclockwise, engaging the clutch plate 24 with the driven plate 22, which, through the gears 28, 36 and 37 rotates the sprocket gear 12 and the drum 10 clockwise until the segment 45 contacts the brush 42 for the "12" key 40.

Figures 2, 3:
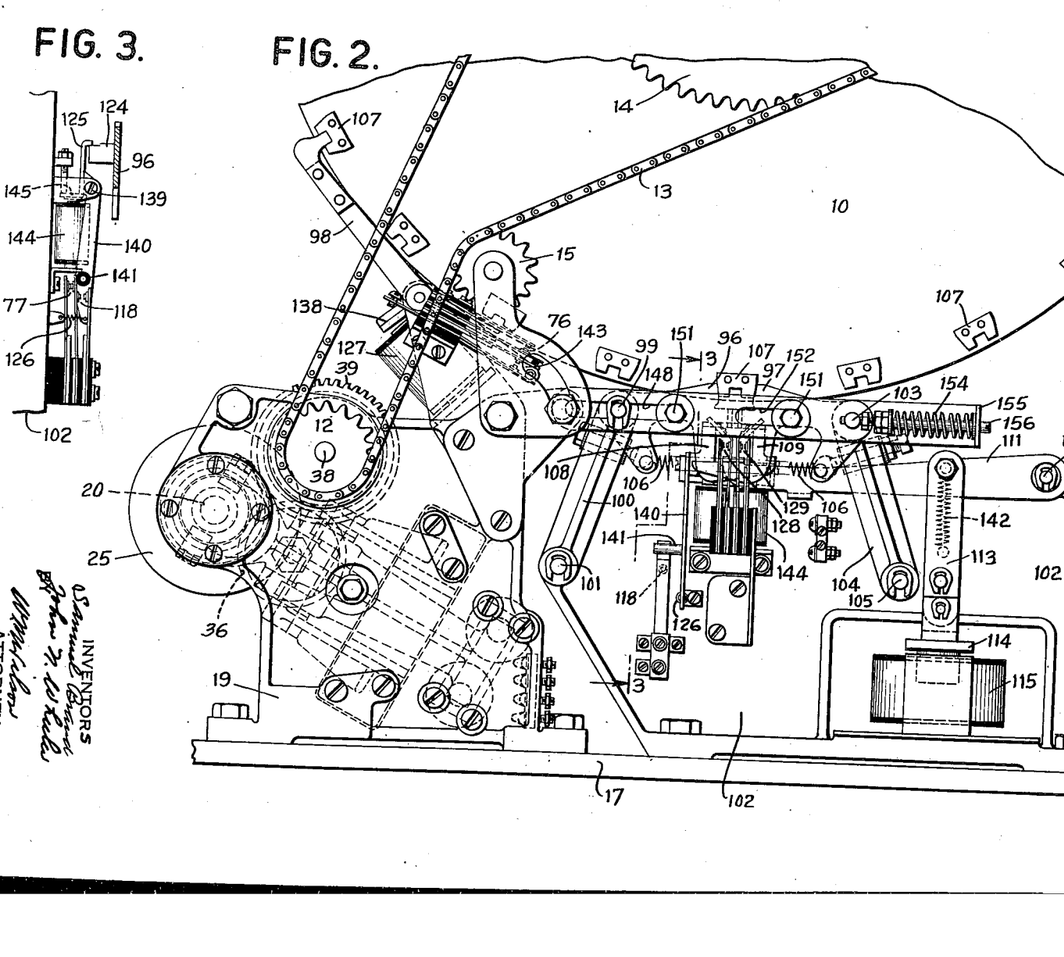
Fig. 2 is a view in side elevation of the bottom of the machine and shows particularly the sorting drum stopping devices for the machine.
Fig. 3 is a detail view of certain contact controlling devices.

The drum 10 is normally held in position by a pair of stop arms 96 and 97 (Figs. 4 and 5) and is also accurately alined in position by a lock arm 98 (Fig. 2). The stop arm 96 is pivotally supported at 99 (Fig. 4) by a pair of arms 100 pivoted on a stud 101 projecting from a frame 102 secured to the base 17. The stop arm 97 is similarly supported at 103 by a pair of arms 104 pivoted on a stud 105 in the frame 102. A spring 106 stretched between projections of the arms 96 and 97 normally holds these arms in their effective or raised positions.

The stop arms 96 and 97 cooperate with blocks 107 secured to the side of the drum 10, there being a block 107 for each compartment position on the drum. Before the drum can be rotated, it is necessary to withdraw the arms 96 and 97 clear of the particular block 107 between said arms. To this end the stop arms 96 and 97 are provided with hooked projections 108 and 109 respectively. Extending immediately above these projections is an ear 110 bent over from the free end of a lever 111 pivoted on a stud 112 (Fig. 2) in the frame 102. A link 113 pivotally connected to the lever 111 has secured to its lower end the armature 114 of a solenoid 115.

Energization of the solenoid 115 attracts its armature 114, drawing the link 113 downwardly and rocking the lever 111 counterclockwise. This movement of the lever 111, through the ear 110, rocks the stop arm 96 clockwise and the stop arm 97 counterclockwise, thus moving said stop arms out of the path of the block 107 with which it is engaged.

The solenoid 115 is energized by the following circuit described with reference to Fig. 6:

This circuit extends from line 48, relay contacts 50a, wires 52, 53, wire 54 at the right, relay contacts 116a closed in a manner now to be explained, solenoid 115, normally closed relay contacts 117a, normally closed contacts 119, normally closed normally closed contacts 118 to line 60. This circuit is normally open at the relay contacts 116a, held open by a relay magnet 116, which is retained energized as long as a key 40 is depressed and the drum stands at a position corresponding to the depressed key. The circuit for retaining relay magnet 116 energized extends as follows, assuming the "1" key to be depressed as shown in Fig. 6, line 48, relay contacts 50a, wires 52, 53 and wire 54 at the left, contacts 44 for the "1" key, wire 43 to the "1" brush 42, segment 45, ring 120, a brush 121, wires 122 and 123, and relay magnet 116 to line 60.

When another key is depressed, the previously depressed key, in this example the "1" key, is immediately released and restored to its undepressed position permitting its contacts 44 to open. This opens the circuit through the relay magnet 116 which, becoming deenergized, permits its relay contacts 116a to close establishing the above described circuit through the solenoid 115.

As the latch arms 96 and 97 approach the lower limit of their movement caused by the energization of solenoid 115, ears 124 formed on the free ends thereof, come below the bent end of a latch arm 125 (see Fig. 3), which arm is immediately rocked clockwise (Fig. 3) by a spring 126 to latch the stop arms 96 and 97 down in their ineffective positions.

Before the drum 10 is free to rotate, the lock arm 98 must also be removed to ineffective position. The nose of this arm as shown in Fig. 2 normally rests in a notch formed in one of the blocks 107. The lock arm 98 is withdrawn by a magnet 127 (Figs. 2 and 6) which is energized, under control of the stop arms 96 and 97 when they are withdrawn to free the drum for rotation. Mounted near the stop arms 96 and 97 are pairs of contacts 128 and 129 connected in parallel and having their inner blades bent outwardly at an angle (see Fig. 2). These angular ends of the inner blades carry blocks 130 of insulating material (Fig. 4). Studs 136 and 137 (Fig. 4) projecting respectively from the stop arms 96 and 97, cooperate with the blocks 30 (see also Fig. 6) to hold the pairs of contacts 128 and 129 open when the stop arms are in their effective positions. When the stop arms 96 and 97 are pulled down to unlock the drum 10, the studs 136 and 137 are carried out of contact with the blocks 130, whereupon the contacts 128 and 129 are closed by the spring tension of the blades.

Closure of contacts 128 or 129 (see Fig. 6) or both energizes magnet 127, which attracts its armature 138 (Fig. 2) and rocks the lock arm 98 clear of the block 107.

It was set forth above how, as the stop arms 96 and 97 approach the limit of their downward movement the latch 125 (Fig. 3), under the influence of its spring 126, rocks clockwise to latch arms 96 and 97 down. The arm 125 is pivoted at 139 and has a downwardly extending tail 140 to which the spring 126 is attached. The tail 140 carries an insulating roller 141 which cooperates with the center one of three contact blades. As viewed in Fig. 3 the right hand pair of contacts 118 (see also Fig. 6) is normally closed and the left hand pair of contacts 77 are normally open. As the latch arm 125 rocks clockwise to latch the stop arms 96 and 97 down, the tail 140 through the roller 141 opens contacts 118 and closes contacts 77. When the contacts 118 are opened, the solenoid 115 (Figs. 2 and 6) is deenergized, allowing a spring 142 (Fig. 2) to raise the arm 111, link 113 and armature 114 to their upper positions.

Closing of contacts 77 completes the circuit through the selected clutch control magnet 75 or 90 upon closure of contacts 76. These latter contacts are closed by a tail 143 (Fig. 2) secured to the lock arm 98 and rocked therewith. Contacts 76 are, therefore, closed when the lock arm 98 is rocked clear of the block 107. The drum 10 is then free to rotate and the proper one of the clutch control magnets is energized to drive the drum to its newly selected position.

The drum continues to rotate until it arrives at the position wherein the compartment corresponding to the depressed key comes opposite the check aperture, whereupon the rotation of said drum is arrested and the drum is accurately alined in position by mechanism now to be described.

It will be remembered that the commutator comprising the segments 45, 46, 47 and rings 49 and 120 (Fig. 6) rotates with the drum 10, whereas the disk 41 together with the brushes 42, 55 and 120 remain stationary. As soon as the segment 45 contacts the brush 42 corresponding to the depressed key, a circuit is established from line 48, relay contacts 50a, wires 52, 53, and wire 54 at the left, contacts 44 of the depressed key, corresponding wire 43, brush 42, segment 45, brush 121, wire 122, and a magnet 144 to line 60. Energization of magnet 144 (see Fig. 3) attracts its armature 145, which is secured to the latch arm 125, rocking the latter counterclockwise to free the stop arms 96 and 97. The spring 106 (Figs. 2 and 5) immediately throws the stop arms upwardly to effective drum locking position. If the drum 10 is rotating in a clockwise direction, the block 107 wipes over stop arm 97 and strikes arm 96. If rotating counterclockwise, the block 107 wipes over arm 96 and strikes stop arm 97.

A slide 146 (Fig. 4) is pivoted at its left hand end on the stud 99 on which the stop arm 96 is pivoted. The slide 146 is slotted to surround and slide over the stud 103 so that as the stud 99 moves to the left the slide 146 moves in the same direction. Similarly, a slide 147 has one of its ends pivoted on the stud 103 on which is pivoted the stop arm 97. The slide 147 is slotted at 148 (Fig. 2) to slide over the stud 99 so that as the stud 103 moves to the right the slide 147 moves in the same direction. Between the slides 146 and 147 is fixedly mounted a friction plate 149 of suitable friction producing material. The slides 146 and 147 are pressed against friction plate 149 by springs 150 surrounding studs 151 carried by the slide 146 and projecting through slots 148 and 152 in slide 147. The studs 151 pass through holes in the friction plate 149 to hold it in position between plates 146 and 147.

Between the studs 99 and 103 is stretched a spring 153 (Fig. 4). Another spring 154 is compressed between the stud 103 and the bent end 155 of the slide 146. The spring 154 surrounds a pivot stud 156 secured to the stud 103 and which passes through the bent end 155 of the slide 146.

Assuming, for example, that the drum 10 is rotating counterclockwise, the block 107 strikes the stop arm 97 (Fig. 2) moves the slide 147 to the right. The shock of the blow is absorbed by the friction between the slide 147 and friction plate 149 and by the extension of spring 153 and compression of spring 154, which springs react to bring the block 107 and the drum to the position wherein the selected compartment is in registry with the check aperture 135. When the block 107 strikes the stop arm 97, it stretches spring 153 (Fig. 4) and compresses spring 154 (Figs. 2 and 4) and block 107 then rebounds against arm 96 and when block 107 strikes the stop arm 97 the action just described, occurs but to a lesser degree. This rebound or "chatter" would be quite extensive if only the springs 153 and 154 were depended upon to bring the drum to rest. The friction member 149 is provided to dampen the rebound action effected by the springs 153 and 154.

It is necessary that the lock arm 98 (Fig. 2) be maintained in its ineffective position until the drum 10 has come to a complete rest. This is effected by maintaining one or the other of the contacts 128 and 129 closed until the drum is completely stopped. This maintains the magnet 127 (Fig. 6) energized to hold the arm 98 in its disengaged position. When the block 107 strikes the stop arm 97, this arm, as stated above, is moved to the right (Figs. 2 and 4) carrying the stud 137 therewith away from the insulating block 130. This permits contacts 129 to remain closed. When the springs 153 and 154 rebound, carrying the drum 10 and block 107 back past center, said block 107 strikes the stop arm 96 moving it slightly leftward, at which time the stud 136 is carried away from the insulating block 130. This permits contacts 128 to close. Thus, if the block 107 is off center in either direction, one or the other of the contacts 128 and 129 is closed. As soon as the drum comes to a complete rest, both contacts 128 and 129 are opened, deenergizing the magnet 127, whereupon the lock arm 98 is rocked clockwise by a spring (not shown) accurately to align the drum.

The instant the segment 45 (Fig. 6) comes into contact with the brush 42 corresponding to the depressed key, the magnet 144 (see also Fig. 3) is energized over the circuit previously traced in order to release the stop arms 96 and 97. Energization of magnet 144 rocks the arm 140 counterclockwise (Fig. 3) or clockwise in Fig. 6 closing contacts 118 and opening contacts 77. This opens the circuit through the selected clutch control magnet 75 or 90. A holding circuit is provided for the selected clutch control magnet, since it is desired to rotate the drum 10 by power until an instant before the block 107 strikes the stop arm 96 or 97, depending on the direction of rotion of the drum. This holding circuit is set up as follows:

The relay magnet 116 remains energized so long as the drum is stationary at the selected compartment position. By the energization of the relay magnet 116 relay contacts 116b (Fig. 6, near lower left hand corner) are closed, closing a circuit from line 48, contacts 116b, wire 158, a relay magnet 159 to line 60. This holds the relay magnet 159 energized holding contacts 159a and 159b open. Upon depression of another key, as set forth above, the circuit through relay magnet 116 is opened causing this relay magnet to be deenergized allowing relay contacts 116b to open. The deenergization of relay magnet 159 permits its relay contacts 159a and 159b to close. It was described above how relay contacts 159b provided a holding circuit over wire 69, relay contact 59b, for relay magnet 59 and also caused relay magnet 71 to be energized. Closure of relay contacts 159b causes the energization of a clutch holding relay magnet 166 by a circuit described as follows: line 48, relay contacts 50a, wires 52 and 53, relay contacts 159b, wire 167, relay magnet 166, wires 168 and 169, contacts 76 and 77 (now closed) to line 60. Relay magnet 166 closes its relay contacts 166a and 166b, the relay contacts 166a establishing a holding circuit for the selected clutch magnet 75 or 90 over wire 169, relay contacts 166a, a wire 172 to line 60. The contacts 166b establish a second holding circuit for the relay magnet 59 extending from line 48, relay contacts 50a, wires 52 and 53, wire 173, relay contacts 166b, wire 69, relay contacts 59a, relay magnet 59 to line 60. This circuit from wire 69 extends also through relay contacts 59a, wire 70, relay magnet 71, wire 72 to line 60, and holds the magnet 71 energized.

When the segment 45 contacts the particular brush 42 corresponding to the depressed key, the block 107 (Fig. 2) is some distance from the point midway between stop arms 96 and 97. However, at this instant, the magnet 144 (Fig. 6) becomes energized opening by roller 141 contacts 76, which would open the circuit for the selected clutch control magnet 75 and 90 were it not for the holding circuit over wire 169, relay contacts 166a, and wire 172 to line 60.

At the same time that the magnet 144 is energized, the relay magnet 116 is energized closing relay contacts 116b. This energizes relay magnet 159, opening relay contacts 159a and 159b. The relay contacts 159a open the circuit to relay magnet 59 over wire 69, relay contacts 59b, relay magnet 59 to line 60. The relay magnet 59 is maintained energized for a brief period over wire 173, relay contact 166b, wire 69, relay contacts 59b, relay magnet 59 to line 60. This holds the relay contacts 59a closed and the relay magnet 71 energized.

Opening of relay contacts 159b, however, opens the circuit to relay magnet 166 which, becoming deenergized, allows its relay contacts 166a and 166b to open; the contacts 166a opening the circuit through the selected clutch control magnet 75 or 90, and the contacts 166b opening the circuit through relay magnets 59 and 71. The contacts 59a and 59b thereupon open and the relay contacts 71c open and relay contacts 71b close. After relay contacts 77 open due to the energization of the magnet 144, the delay due to energizing relay magnets 116 and 159 and deenergizing relay magnet 166 is sufficient to maintain the selected clutch magnet 75 or 90 energized until an instant before the block 107 strikes the stop arm 96 or 97.

It is to be understood as previously stated that the relay magnets 59 and 71 are energized only when the drum 10 rotates counterclockwise, that is, when a key in the group 13-14 is depressed. If a key 1-12 inclusive is depressed the circuit will extend to the segment 47 but since it has no connection to the ring 49, no circuit is established over wire 56, relay contacts 71a, wire 58 and relay magnet 59 to line 60. Thus, relay magnet 59 is not energized, relay contacts 59a remain open and relay magnet 71 is not energized. Contacts 71b remaining closed cause energization of clutch control magnet 90. The functions of relay magnets 159 and 166 are the same whether clutch control magnet 75 or 90 is selected.

Motor release bar

Check feeding operations are rendered operative when a motor release bar 175 is depressed. As best shown in Fig. 1 the motor release bar 175 is positioned exteriorly of the check sorting machine for a manual depression.

The motor release bar 175 (Fig. 7) is carried by a slidable key stem 176 carrying a pin 177 which when the key stem is depressed closes contacts 178. This completes a circuit, as shown in Fig. 6, from the line 48, through relay contacts 116b, now closed, contacts 178, relay contacts 179a now closed, clutch control magnets 180 to the line 60 thus causing the energization of the magnets 180.

Figure 7:
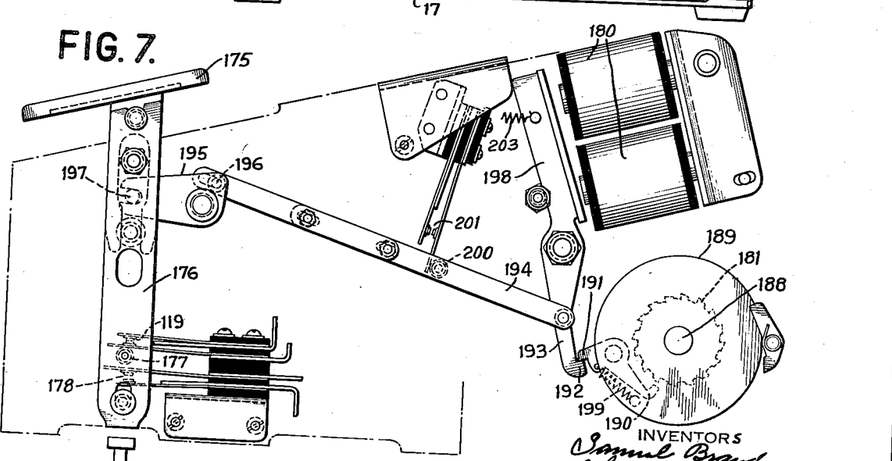
Fig. 7 which is on the sheet with Fig. 1 is a view in side elevation of the motor release bar and the one revolution clutch mechanism controlled thereby.

Referring to Fig. 7 there will be seen a showing of a ratchet clutch wheel 181 which constantly rotates by driving means now to be described. Secured to the drive shaft 21 is a sprocket gear 182 (Fig. 4) around which passes an endless chain 183 (Fig. 1) surrounding a sprocket gear 184 attached to a shaft 185. Attached to said shaft is a pinion 186 meshing with a gear 187 loosely mounted on a shaft 188 and to which gear 187 the ratchet wheel 181 is secured (see Fig. 7).

Attached to the shaft 188 is a disk 189 carrying a spring-pressed clutch pawl 190 having a tail 191 normally engaged by a shoulder 192 of a clutch control arm 193. By means of a link 194 the clutch control arm 193 is connected to an arm 195 by a pin 196 carried by the arm 195 engaging a slot in the link 194, said arm 195 also having a slot receiving a pin 197 carried by the key stem 176.

The result of the above construction is that when the key stem pin 177 will close contacts 178 when the key stem 176 is depressed to cause the energization of the magnets 180. From Fig. 7 it will be seen that the armature 198 of magnets 180 is integral with the arm 193 so that the energization of magnets 180 will rock the clutch control arm 193 to remove shoulder 192 from the tail 191 thereby permitting a spring 199 to rock the clutch pawl 190 into engagement with the ratchet wheel 181 thus rotating the drive shaft 188.

When the link 194 is moved rearwardly a pin 200 carried thereby will close safety contacts 201 and said contacts as shown in Fig. 6 shunt relay contacts 116b thereby maintaining the circuit to magnets 180 closed in the event that relay contacts 116b may open.

At about 250° rotation of the shaft 188 a cam 202 carried thereby will close cam contacts CC—1 thereby closing, as shown in Fig. 6, a circuit to a relay magnet 179.

The latter will now open the relay contacts 179a thereby opening the circuit to the clutch control magnets 180 and even if the motor release bar is held depressed it will be seen that a spring 203 will rock the armature 198 and clutch release arm 193 so that at the completion of one revolution of the disk 189 and shaft 188 the shoulder 192 of the arm 193 will engage the clutch pawl 190 and disengage it from the ratchet wheel 181. In this case the slot in the link 194 will permit the movement of the link 194 to the right to open the contacts 201 and without affecting the movement of the motor release bar 176.

When the relay contacts 179b close it will be seen from Fig. 6 that the circuit for relay magnet 179 is closed to retain its relay contacts 179a opened as long as the motor release bar 175 is held depressed. When manual pressure on the motor release bar 175 is relieved a spring (not shown) will raise the motor release bar 175 and key stem 176 permitting contacts 178 to open, to cause the deenergization of relay magnet 179, the opening of relay contacts 179b and closing of relay contacts 179a. Thus only a single revolution of the drive shaft 188 can be effected even if the motor release bar 176 is held depressed.

It should further be noted that when the motor release bar 175 is depressed the pin 178 carried by the stem 176 will permit contacts 119 to open (see Fig. 6 upper right) thus opening the circuits to the line 60 and making the reel selecting mechanism inoperative during the check feeding operation.

Check feeding mechanism

After the drum 10 has been positioned according to the selector key 40 depressed, the check 385 to be sorted is inserted into an aperture 135 (Fig. 8) and the motor release bar 175 then depressed to cause it to be fed into the selected compartment.

Figure 8:
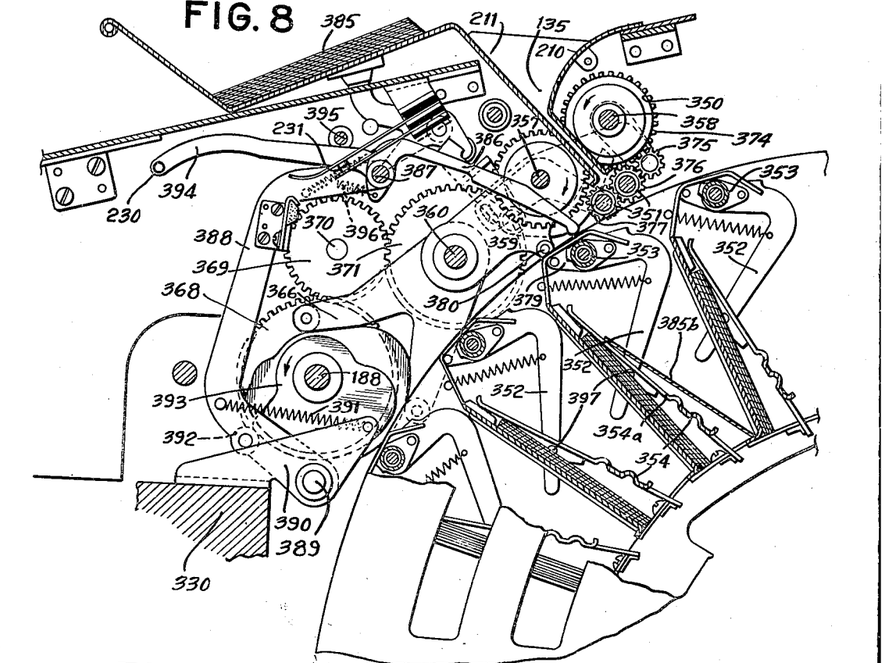
Fig. 8 is a fragmentary view in side elevation of the check feeding mechanism.
Figure 9:
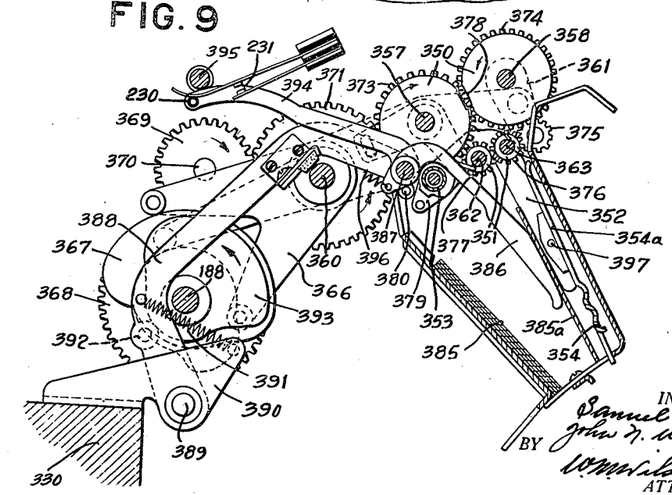
Fig. 9 is a view similar to Fig. 8 but showing certain parts in operated position.

The checks are fed into the compartments by means of a plurality of pairs of feed rollers 350 and pairs of smaller rollers 351 (Figs. 8 and 9). These feed rollers normally occupy the position with relation to the sorting drum, in which they appear in Fig. 8. During the rotation of the check feeding rollers to feed a check into a selected compartment the rollers 350 and 351 are rocked downwardly to the position shown in Fig. 9. The pairs of rollers 350 are secured to the shafts 357 and 358 (Figs. 8 and 9), the shaft 357 being carried between a pair of frame plates 359 (see also Fig. 10) secured to a shaft 360 journaled in suitable side frames of the machine. The shaft 358 is carried between upwardly extending brackets 361, one secured to each of the pair of frame plates 359. The rollers 351 are carried on shafts 362 and 363, the latter shaft being supported between the frame plates 359 and the shaft 362 being supported between adjustable brackets 364 pivoted on the shaft 357 and adjustably secured to the frame plates 359 by screws 365 (see Fig. 10).

Also secured to the shaft 360 is a cam follower arm 366 carrying rollers cooperating with a pair of complementary cams 367 secured to the shaft 188 (Figs. 8, 9, and 10) which, it will be remembered, receives one complete counterclockwise rotation at each operation of the machine. At the proper time the cams 367 rock the shaft 360 and the frame plates 359 clockwise to bring the rollers 351 into close proximity to the selected compartment and at the same time a gear 368 (Fig. 8) fast on the shaft 188 rotates the rollers 350 and 351 in the directions indicated by the arrows through the following described train of gears: The gear 368 drives an intermediate gear 369 mounted on a stud 370. The gear 369 meshes with a gear 371 loose on the shaft 360, which gear 371 meshes with a gear 372 (Fig. 10) fast on the shaft 357. A gear 373 (Fig. 9) also fast to the shaft 357 meshes with a gear 374 fast on the shaft 358. The counterclockwise rotation of the gear 368 through the train of gears 369 and 371 rotates the gear 372, the shaft 357 and the roller 350 fast thereon in a clockwise direction, and also rotates the gear 374, shaft 358 and the feed roller 350 on this shaft in a counterclockwise direction. The gear 374 (Fig. 9) meshes with an intermediate gear 375 which in turn meshes with a gear 376 secured to the shaft 363, and the gear 376 meshes with a gear 377 fast on the shaft 362. This causes the feed rollers 351 on the shaft 363 to rotate counterclockwise and the feed rollers 351 on shaft 362 to rotate in a clockwise direction.

The rollers 350 are notched substantially as shown at 378 (Fig. 9) so that when the check is dropped into the aperture in the chute 135 (Fig. 8) the lower edge thereof rests on the shoulders of the notch 378 substantially between the set of rollers 350 permitting an initial rotation of the rollers 350 before the check is fed thereby. The rotation of rollers 350 and 351 in the direction of the arrow feeds the check into the selected compartment.

As the checks 385 are fed into the compartment by rollers 351 they are held fed between a retainer plate 354, and a series of fingers 386 (Figs. 8 and 9) which are secured to a rod 387 carried by a pair of arms 388. The arms 388 are secured to a shaft 389 pivotally supported on brackets 390 (only one of which is shown) secured to a sub-base 330. Springs 391 normally urge the arms 388 clockwise pressing rollers 392 carried by the arms 388 against cams 393 fast on the shaft 188.

The fingers 386 are normally in the Fig. 8 position and when the shaft 188, and consequently the cams 393 are rotated counterclockwise, the contour of the cams 393 permits the springs 391 to rock the arms 388 quickly clockwise from the Fig. 8 position to the position in which they appear in Fig. 9 to position the fingers 386 in the compartment. Arms 394 are secured to the shaft 387 and are urged by springs 396 attached to the extensions of fingers 386 to cause the arms 394 to be urged against a guide rod 395 so that as the fingers 386 are moved into the compartment they are guided by the arms 394 cooperating with grooves in said guide rod 395.

When the selected compartment comes into a record receiving position an arm 379 comes to rest adjacent a roller 380 (Figs. 8 and 9) carried by one of the frame plates 359. After the fingers 386 are moved into the compartment as shown in Fig. 9 the frame plates 359 are rocked by the cams 367 as previously stated and a roller 380 rocks an arm 379. The arm 379 is connected to an arm 352 by a sleeve 353 so as to rock arm 352 counterclockwise against the action of a spring 355 carrying the check retainer plate 354 which is pivoted to said arm 352 at 397 from the position in which it appears in Fig. 8 to the position in which it is shown in Fig. 9. By means of slots 354a in the retainer plate 354 the latter is moved past the fingers 386 which are now in the compartment so that the incoming check 385 may be fed between the plate 354 and fingers 386 by the rollers 351 which are now rotating. Reference character 358 in Fig. 9 indicates a check fed in a compartment to show how it is fed between the plate 354 and fingers 386.

After the card is fed in the compartment between the fingers 386 and the retainer plate 354, the cams 393 restore the arms 388 to their original position withdrawing the fingers 386 from the compartment. The cams 367 then rock the frames 359 counterclockwise, carrying the feed rollers outwardly to their normal positions and this allows the spring 355 to carry the retainer plate 354 against the stack of checks 385 to firmly hold the check fed into the compartment against the checks already in the compartment.

*Means for determining proper feeding of checks*

The machine is provided with check sensing mechanisms by means of which it can be determined whether checks are fed properly by the check feeding mechanism into the selected compartment and also means for indicating the fact that the check has not been inserted by the operator for a check feeding operation.

Since operations such as printing and totalizing are invariably effected in the present machine by the depression of the motor release bar 175 it is essential that checks also be correspondingly fed so that the printed lists of checks and numerical totals thereof correspond with the checks fed in the related compartment.

The various sensing mechanism perform different functions to take care of all the different failures that might occur in check feeding operations and are described in separate sections following.

Means to determine whether a check is fed or not

Figures 10, 11, 12:
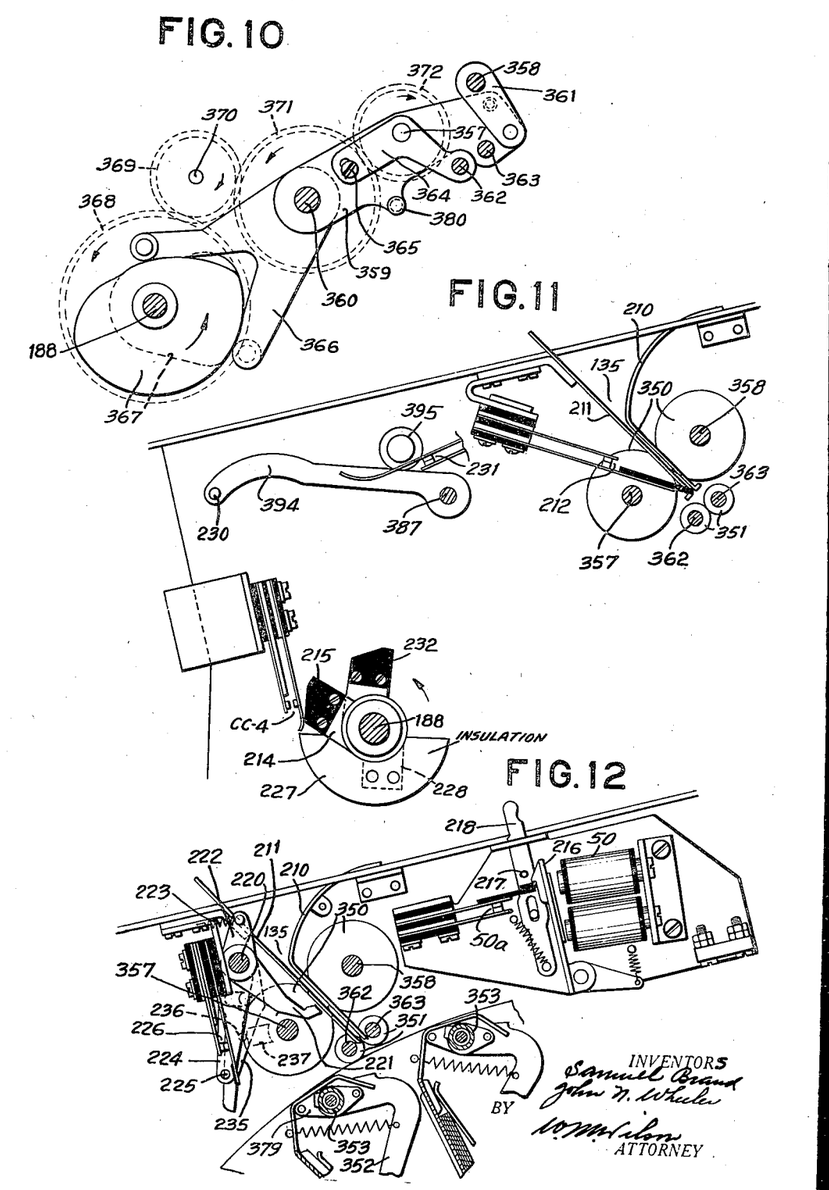
Fig. 10 is a view in side elevation of the frame carrying the check feeding rollers.
Figs. 11 and 12 are views showing the improved check sensing mechanism for determining failure of a check to feed or improper feeding thereof.

This mechanism is shown in Fig 11 and its operation will be understood with particular reference to the wiring diagram in Fig. 6.

From Fig. 11 it will be seen that check feeding aperture 135 consists of an upper plate 210 and a plate 211 between which the check is manually inserted and pushed downwardly so that the leading edge rests on the bottom shoulders of the notch 378 (see Fig. 9) formed in the pairs of rollers 350. When the check is so inserted, after the depression of the motor release bar 175 the check will be fed to engage the lower blade of a set of contacts 212 (Fig. 11) thereby displacing the lower blade and opening said contacts and retaining them open while the check being fed is in cooperation therewith. As shown in the wiring diagram a similar set of contacts 213 are also provided and are likewise adapted to be opened by the check if the check is properly fed by rollers 350. Each set of the two sets of contacts 212 and 213 are located between adjacent pairs of rollers 350 and the sets of contacts are separated sufficiently so that the two ends or portions of the incoming check will, if the check is properly inserted and fed, open both sets of contacts 212 and 213.

Attached to the shaft 188 is an arm 214 (Fig. 11) carrying a block 215 of insulating material adapted in approximately 15° rotation of shaft 188, or when the check has been fed 1/8", to close contacts CC—4. As shown in Fig. 6, there is a circuit from line wire 48, through contacts CC—4, contacts 213, contacts 212, a relay magnet 50, and to the line side 60. If the check is inserted to engage the shoulders of the notch 378 the check will be fed properly to open both sets of contacts 212 and 213 so that if both sets are open when contacts CC—4 close relay magnet 50 will not be energized.

If the check is not inserted in the aperture 135, or if it is not pushed downwardly sufficiently to be seized by the pairs of rollers 350 and fed, both sets of contacts 212 and 213 will be closed when contacts CC—4 close thus energizing relay magnet 50.

As shown in Fig. 12 when relay magnet 50 is energized its armature 216 will be attracted to unlatch the upper blade of contacts 50a which thus open by their resiliency. As shown in Fig. 6, opening of contacts 50a will disconnect wire 52 from the line side 48 so that the keys 40 will be inoperative to select another compartment thus indicating to the operator the failure of a check to be fed.

Since the normally closed circuit through relay magnet 116 is now open, relay magnet 116 is deenergized and its relay contacts 116b will open thus preventing the energization of the clutch control magnets 180 by a subsequent depression of the motor release bar 175. Hence, such abnormal check feeding conditions will render the motor release bar 175 inoperative and prevent the use of keys 40 to select another compartment.

To restore the circuit to normal condition, after the operator is apprised of the failure of a check to feed, or the failure to insert a check, a slidable member 218 (Fig. 12) is manually depressed so that a pin 217 carried thereby will depress the upper contact blade of the set of contacts 50a to cause them to be relatched in closed position by the armature 216 of the magnet 50. The check can now be inserted to be fed, or reinserted properly and the operator can continue with the normal machine operations after the motor release bar 175 is depressed to feed the check into the selected compartment and which should have been fed.

Sensing means to determine whether check fed is too wide or fed at an angle

From the previous description it is obvious that the feeding rollers 350 are given an invariable rotation and their size will give sufficient feed of a check to feed a check of average width into the selected compartment. If a check is of too great a width (in the direction of its travel) it will not be fed completely into the selected compartment and this will also occur if the check is fed at an angle. In such an abnormal machine operation this indication is made to the operator by locking the compartment selecting mechanism, that is, the control by keys 40 is rendered inoperative, without, however, locking the motor release bar 175. The latter can again be depressed to complete the feeding operation of the unusually wide check or the one inserted crooked in the check feeding aperture. This mechanism is shown in Fig. 12 and will be understood with reference to the wiring diagram in Fig. 6.

To this end attached to the rock shaft 220 is a pair of feeler fingers 221 each located between an adjacent pair of feeding rollers 350. Attached to the shaft 220 is a depending arm 235 having an upward extension 222 to which is connected a spring 223 which tends to rock the shaft 220 to urge the feeler fingers 221 so that they may project through slots in the plate 211, but this is normally prevented by the coaction of a pin 236 carried by the arm 235 with a plate 237 carried by the lower one of the rollers 350.

With a check inserted in the aperture 135 it will be seen that upon the initial clockwise rotation of the roller 350 carrying the plate 237 the roller will move the plate 237 out of cooperation with the pin 235 so that the spring 223 will rock the feelers to contact with the check. At this time an arm 224 attached to shaft 211 and carrying a pin 225 will be rocked so that the pin 225 engages the blade of a set of contacts 226 without, however, moving the blade to open the contacts 226 if the feeler fingers 221 contact with a check.

Referring to Fig. 11 a disk 227 of insulating material is carried by an arm 228 secured to the shaft 188 and is adapted to close contacts CC—3 (see Fig. 6) located adjacent contacts CC—4 at 180° rotation of shaft 188 and open at 350°.

If the check is of normal width and is fed in straight the trailing edge of the check will have been fed past the feeler fingers 221 so that spring 223 will further rock the feeler fingers 221 and cause arm 224 to open the contacts 226 before the disk 227 closes contacts CC—4. The check is now clear of the rollers and will be fed into the selected compartment.

If the check is too wide, or fed at too great an angle, or even inserted too late and after the motor bar has been depressed, the trailing edge of the check of abnormal width will be in cooperation with the feeler fingers 221 and hold them back so that contacts 226 are retained closed and are closed when contacts CC—3 close. This will close a circuit from the line side 48, through contacts CC—3, contacts 226, a relay magnet 117 to the line side 60. The latter closes its relay contacts 117b thereby connecting a buzzer B across the line wires 48 and 60 indicating to the operator by the audible buzz of the buzzer that a check has not been completely fed to the compartment.

Since energization of relay magnet 117 opens relay contacts 117a the reel selecting mechanism will be rendered inoperative.

The operator may, however, depress the motor release bar 175 to effect a second feeding operation so that the check will now be fed out of cooperation with the feeler fingers 221 and entirely out of cooperation with the feeding rollers and into the selected compartment.

*Means for determining whether or not previous check is properly fed into selected compartment*

It has been found that occasionally a check curls so that it is fed behind the retainer plate 354 or to the right thereof as shown in Fig. 8 in which position the check 385b is out of sequence and later might drop out of the compartment as the sorting drum subsequently rotates.

As the fingers 386 reach the position in a compartment shown in Fig. 9 a stud 230 carried by one of the arms 394 will normally open contacts 231 as shown in Fig. 9 and the retainer plate 354 is now shifted to the right past the fingers 386 permitted by the slots 354a in the plate 354, in the normal manner previously described.

In the event that the check last fed to the compartment just selected is at the right of the plate 354 instead of having been fed to the left, as the plate 354 is moved to the right, this improperly fed check 385b (Fig. 8) is now between the fingers 386 and the plate 354 and the latter cannot pass beyond the fingers 386 due to the obstruction by the check which is now between the fingers 386 and plate 354. Thus the arm 394 controlling contacts 231 will be rocked to an abnormal position downwardly permitting contacts 231 to close. At this time a cam plate 232 (Fig. 11) attached to shaft 188 will close contacts CC—2 thereby causing as shown in Fig. 6 the energization of the relay magnet 117 and effecting the signaling by the buzzer B and rendering the reel selecting mechanism inoperative, as previously explained.

Machines of the type herein disclosed are provided with an opening at the side of the machine to give manual entrance to checks in the compartments. This permits the improperly fed check to be withdrawn and re-inserted in proper position.

The last described precautionary device prevents the loss of checks into the internal mechanism of the machine and possibly their destruction and this additional safeguard adds to the efficiency of the machine.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a manually controlled sorting machine, record sorting compartments, manually controlled means for selecting said compartments, means comprising feeding rollers for feeding records to the selected compartment, electrical contact means displaced by a record emerging from said rollers, devices for rendering the manually controlled compartment selecting means inoperative, and means controlled by said electrical contact means to render said devices effective upon the absence of a record emerging from said rollers to displace said electrical contact means.

2. In a manually controlled record sorting machine provided with a plurality of record sorting compartments and key controlled means for selecting said compartments for receiving records fed thereto, the combination with means for feeding said records to a selected compartment, of manually controlled means for causing an invariable operation of said feeding means, electrical contact means operated by a record emerging from said feeding means, means for rendering said key controlled compartment selecting means inoperative, and means rendered effective under control of the electrical contact means when the latter is unoperated by a record for causing the operation of the means for preventing the operation of the key controlled compartment selecting means.

3. In a manually controlled record sorting machine, record sorting compartments, manually operated means, means controlled thereby for selecting said compartments, devices for rendering said manually operated means ineffective to control said selecting means, means comprising feeding rollers for feeding records to the selected compartment, manually controlled means for causing the operation of said feeding means, means displaced by a record emerging from said rollers, means under control of the last named means upon failure of the latter to be displaced by a record to render said devices effective, thereby preventing subsequent compartment selecting operations while permitting a subsequent operation of the manually controlled means to feed the record into the compartment selected to receive such record.

4. In a manually-controlled record sorting machine, record receiving sorting compartments, manually-controlled means for selecting said compartments, record feeding means comprising feeding rollers, manually-controlled means for causing an invariable operation of said feeding rollers, electrical contact means so disposed with respect to said feeding rollers as to be engaged and opened by a record emerging from said rollers, electrical contact means closed by means operable by the second-named manually-controlled means and when the first named electrical contact means are adapted to be displaced by the emerging record, devices for rendering the first-named manually-controlled means inoperative, and means controlled by both of the aforesaid electrical contact means for causing the operation of the aforesaid devices and rendered effective upon the absence of a record emerging from said rollers to open the first-named electrical contact means.

5. In a machine of the class described, a sorting compartment, record feeding means comprising rollers for feeding a record of a series of records of different sizes comprising normal and abnormal sizes, initially positioned between said rollers to said compartment, feeler fingers, means for causing said fingers to be moved for sensing a record being fed to determine the presence of a record between said feeding rollers for a feeding operation, means for causing the operation of said feeding rollers the same extent for each feeding operation whereby said feeding rollers feed a record of normal size completely out of cooperation with said feeler fingers, the latter, however, sensing that a record of abnormal size is still between said rollers after a feeding operation, a machine controlling means, and means controlled by said feeler fingers for causing the operation of the machine controlling means when said feeler fingers determine that a record of abnormal size is still between said rollers after a feeding operation.

6. In a manually-controlled record sorting machine, sorting compartments and means for feeding records to said compartments comprising feeding rollers, electrical contacts, sensing means cooperating with a record emerging from said rollers and means controlled thereby to cause a displacement of said contacts when a record is completely out of correlation with said sensing means, but permitting when such correlation is maintained an undisplaced position of said electrical contacts, other electrical contact means operable in timed relationship with said feeding means for causing the closure of said other electrical contacts, and means in a circuit controlled conjointly by both of said electrical contacts for causing when the first-named contacts are in undisplaced position, due to the continued correlation of the record and the sensing means after a record feeding operation, the indication of such fact.

7. In a manually controlled sorting machine for sorting records in a plurality of selectable compartments, in combination, record feeding means receiving a record for feeding said record to a selected compartment, a plurality of feeler fingers and means for retaining them displaced out of the path of a record fed by said feeding means, means for rendering said retaining means inoperative for causing said feeler fingers to determine whether a record is in cooperation with said feeding means, electrical contacts, electrical contact controlling means therefor and movable under control of said feeler fingers, and means rendered effective by said feeler fingers for causing said contact controlling means to effect a change in position of said electrical contacts when the record is fed out of cooperation with said feeding means, but permit the unchanged position of said electrical contacts when a record is retained in cooperation with said feeler fingers after a record feeding operation.

8. In a manually controlled record sorting machine provided with a plurality of sorting compartments and key-controlled means for selecting said compartments for receiving records fed thereto, the combination with means for feeding records to a selected compartment, manually controlled means for effecting an invariable operation of said feeding means to feed a record of predetermined width completely out of cooperation with said feeding means and into the selected compartment, electrical contact means, means cooperating with a record and positioned by a record which is not fed completely out of cooperation with the feeding means to prevent a change in position of said electrical contact means, means for preventing the effective operation of said key controlled means, and means including said electrical contact means and rendered effective by an unchanged position of said electrical contact means for causing the operation of the means for preventing the operation of said key controlled means.

9. In a record sorting machine, sorting compartments, machine controlling means for said sorting machine, means for feeding a record to a sorting compartment, a clamping means for clamping records fed to one side of said clamping means in said sorting compartment, and means rendered operable by said clamping means and a record fed improperly to the other side of said clamping means for causing the operation of said machine controlling means.

10. In a record sorting machine, a sorting compartment, a clamping plate in said sorting compartment, guide fingers adapted to be projected in said compartment, means for moving said clamping plate past said fingers, machine controlling means, and means under control of said fingers and rendered operable by failure of said plate to move past fingers due to an improperly fed card interposed between said plate and fingers for causing the operation of the machine controlling means.

11. In a record sorting machine, a sorting compartment, a clamping plate positioned in said compartment to provide a record receiving space with respect to a wall of said compartment, means for moving said clamping plate to said position, and means rendered operable by a record obstructing the movement of the clamping plate to such a position for indicating such fact.

12. In a record sorting machine, in combination, a record sorting compartment, a clamping plate for said records, means for normally feeding records in said compartment to one side of said clamping plate, machine controlling means, and means cooperating with a record improperly fed to the other side of said clamping plate for causing the operation of said controlling means.

13. In a sorting machine, record sorting compartments, means for selecting said compartments for sorting operations, a plurality of keys for controlling said selecting means, means for feeding records to said compartments, devices for rendering the selecting means inoperative for control by said keys, electrical contact means displaced by a record which is fed to said compartments, and electrically controlled means controlled by said electrical contact means for rendering the devices effective upon the absence of a record displacing said electrical contact means.

14. In a record sorting machine controlled by records of different sizes, record receiving sorting compartments, means for selecting said compartments, record feeding means comprising feeding rollers, means for causing an operation of said feeding rollers an invariable amount to thereby feed a record of normal size completely out of cooperation with said feeding rollers and into the selected compartment, means cooperating with the records sorted for sensing the possible continued cooperation of a record with said feeding rollers at the termination of a feeding operation, thereby sensing the presence of a record of abnormal size, devices for rendering the compartment selecting means inoperative, and means controlled by said sensing means for causing upon the sensing of a record of abnormal size said devices to be operative to prevent a subsequent operation of said selecting means thereby enabling a second operation of the feeding rollers to feed the record of abnormal size to the pre-selected record receiving compartment.

15. In a record sorting machine in which successively fed records are selectively segregated into selected sorting compartments, means for feeding the records into each of said selected compartments in substantially a vertical direction so that all of the records in one compartment rest in the compartment on the lower edges of said records and when properly fed are disposed in a stacked relationship with other records therein, means in each compartment and cooperating with each record fed in the compartment for determining whether each record fed therein is properly fed so as to effect a stacked relationship with the other records already fed in the same compartment, and means controlled by said determining means for indicating when the stacked relationship in any compartment is altered by the improper feeding of a record to the compartment.

SAMUEL BRAND.
JOHN N. WHEELER.